United States Patent Office 3,338,716
Patented Aug. 29, 1967

3,338,716
LIGHT-SENSITIVE COMPLEX OF SOLUBLE SILVER SALTS AND CELLULOSE DERIVATIVES
Richard T. Gardner, Jr., Newark, and Daniel J. Monagle, Wilmington, Del., assignors to Hercules Incorporated, a corporation of Delaware
No Drawing. Filed Dec. 4, 1963, Ser. No. 328,100
13 Claims. (Cl. 96—113)

ABSTRACT OF THE DISCLOSURE

The present application relates to a light-sensitive complex comprising the reaction product of a water-soluble ether of cellulose or of starch and water-soluble silver ions, and to a process of preparing such a complex.

---

This invention relates to photo-sensitive film-forming complexes comprising the reaction product of water-soluble polysaccharide derivatives and water-soluble silver ions, to a method of making said complexes and to photographic and photo-reproduction materials incorporating said complexes.

The term "complex" as used herein with reference to the reaction product of a water-soluble polysaccharide derivative and a water-soluble silver ion is used to indicate interaction between the polysaccharide molecules and silver ions. However, it is not intended to limit the invention to any specific theory since the exact theory or mechanism for the complexes is not entirely understood.

Prior art photo-sensitive compositions comprise water-insoluble silver halides, i.e. silver chloride, silver bromide and silver iodide, and water-sensitive polymers; the silver halide particles serving as the light-sensitive material and the polymer serving merely as the carrier or film former. The prior art compositions are in the form of an emulsion or a dispersion of the water-insoluble silver halide particles in the film-forming material. Such emulsions or dispersions are cast as a film on a transparent base and allowed to dry. The film thus formed is a semi-solid suspension in which the rate of Brownian movement and gravitational settling of the water-insoluble silver halide particles are reduced.

The prior art compositions all have objectionable features, including the agglomeration and settling of the silver halide particles in a coarse, random fashion and the necessity of using a catalyst to obtain increased light sensitivity. The former objection is one reason commercial photographic films are dated.

An object of this invention is to provide photosensitive film-forming complexes and a method of making said complexes from water-soluble polysaccharide derivatives and water-soluble silver ions. Another object is to provide photosensitive film-forming complexes having increased light sensitivity. Still another object is to provide photo-sensitive complexes characterized by the advantage that the complexes are easily formed into film without the need for a suspending agent or binder.

The above and other objects are accomplished according to this invention by carrying out the process which comprises reacting a water-soluble polysaccharide derivative with water-soluble silver ions in an aqueous medium in the substantial absence of light.

We have found according to this invention that our process gives a complex that is both light-sensitive and film-forming, and that the light-sensitivity of our complex is substantially greater than the light-sensitivity of the water-insoluble silver halide particles of the prior art compositions. Upon exposure to light the complexes of this invention decompose autocatalytically and undergo an almost immediate color change. The color and color intensity of the exposed complex may be varied since they are both dependent upon the specific polysaccharide derivative used in the preparation of the complex. The complexes of this invention are self-suspending and self-binding since they are products of materials which are themselves film-formers and binders. The complexes are easily formed into stable, homogeneous, photo-sensitive film without the need for a suspending agent or binder. Film produced from the complexes of this invention exhibits greater integrity since there are no water-insoluble solid silver halide particles to agglomerate and settle out.

It will be noted that in order to form the complexes of this invention we must use a water-soluble silver salt. Any of the various water-soluble silver salts may be used, for example, silver nitrate, silver acetate or silver fluoride. The amount of silver ions used is not critical and is preferably varied depending on the specific use to be made of the photo-sensitive complex. Normally, the polysaccharide and the silver salt are mixed together in the form of their aqueous solutions to form the light-sensitive, film-forming complex. For example, in accordance with the present invention, good results have been obtained employing an aqueous solution comprising 0.005%–20% soluble silver salt; thus, when using a 1% aqueous polysaccharide solution, the ratio of silver salt to polysaccharide derivative may vary from 20:1 to 1:200. If desired, the polysaccharide derivative and the silver salt may be added in dry form (e.g., using the same ratio range as for aqueous solutions) to an aqueous solution in the substantial absence of light.

The temperature employed for carrying out the reaction between the water-soluble polysaccharide derivatives and the water-soluble silver ion in preparing the complex is not critical. Good results have been obtained in accordance with the present invention over a wide range of temperatures, e.g. from 40° F.–120° F. However, one would usually carry out the process at normal room temperature, e.g. 66° F.–74° F.

The water-soluble polysaccharide derivatives which may be used in accordance with this invention include the water-soluble derivatives of cellulose and starch. Typical examples of such water-soluble polysaccharide derivatives include the following and the like: cellulose derivatives, e.g. carboxyalkyl celluloses such as carboxymethylcellulose, dialkylaminoalkyl celluloses such as diethylaminoethyl cellulose, hydroxyalkyl celluloses such as hydroxyethyl cellulose, hydroxypropyl cellulose, carboxyalkyl hydroxyalkyl celluloses such as carboxymethyl hydroxyethyl cellulose, carboxymethyl hydroxypropyl cellulose, alkyl celluloses such as methyl cellulose, alkyl hydroxyalkyl celluloses such as ethyl hydroxyethyl cellulose, alkylene celluloses such as allyl cellulose, and alkylene alkyl celluloses such as allyl ethyl cellulose, either in the free acid form or water-soluble salt thereof such as alkali metal and ammonium salts; starch derivatives, e.g. alkyl starches such as methyl starch, alkylene starches such as allyl starch, carboxyalkyl starches such as carboxy-methyl starch, carboxyalkyl hydroxyalkyl starches such as carboxymethyl hydroxyethyl starch, carboxymethyl hydroxypropyl starch, hydroxyalkyl starches such as hydroxyethyl starch, hydroxypropyl starch, dialkylaminoalkyl starches such as diethylaminoethyl starch, and dialkylaminoalkyl hydroxyalkyl starches such as diethylaminoethyl hydroxypropyl starch. The starches used in this invention are substantially soluble in water at the time of use, i.e. substantially all of the granules thereof are in a gelatinized state.

In the examples, "CMC" and "CMHPS" mean carboxymethylcellulose and carboxymethyl hydroxypropyl starch, respectively, and are in the form of the water-soluble sodium salt thereof except as indicated in Example 5 where the free acid form of CMC is used. Elsewhere in this specification where these terms or abbreviations are used they include these materials either in the form of their water-soluble salts or their free acid form. In this specification, MC, HEC, EHEC, HPS and DEAEHPS mean methyl cellulose, hydroxyethyl cellulose, ethyl hydroxyethyl cellulose, hydroxypropyl starch and diethylaminoethyl hydroxypropyl starch, respectively.

The following examples are intended to illustrate the invention but not to limit its scope beyond the appended claims. In the examples percent and parts are by weight unless otherwise indicated. In Examples 1–17, equal parts of the aqueous solution of water-soluble polysaccharide derivative and the aqueous solution of water-soluble silver salt were added to a reaction vessel while stirring, in the substantial absence of light. In each example a gelatinous precipitate formed immediately and in some examples remained as a stable suspension. A portion of each precipitate was stored in a substantially light-free container. The remaining portion of each precipitate was stored under visible light. In all cases the portion of each precipitate exposed to light began to change color almost immediately and completed the color change to the color indicated within a few minutes. The portion of each precipitate stored in the substantial absence of light remained unchanged in color until exposed to visible light whereupon they also began to change color almost immediately and completed the color change to the color indicated within a few minutes.

*Examples 1–11*

Examples 1–11 show the use in accordance with the present invention of various water-soluble ethers of cellulose and starch in combination with various water-soluble silver salts.

tion in photographic and photoreproduction processes. Various application techniques may be employed for casting homogeneous films from the complexes of this invention, for example transfer roller, cast coating, dip coating, using an air knife to remove the excess upon emergence from the bath, or by conventional spreading using a doctor knife to control the thickness of the film. The desirable features are that the coating be uniform, flexible and adherent to the base material. Any of the conventional base materials may be used, for example paper, cloth, cellulose acetate film and the like.

*Example 18*

Example 18 demonstrates one of the many uses of the photo-sensitive film-forming complexes of this invention.

A hydroxypropyl starch-silver ion complex was prepared in the manner described in Example 1, by combining equal parts of a 25% aqueous solution of hydroxypropyl starch and a 40% aqueous solution of silver nitrate, then cast on a glass plate base and allowed to dry. One sample of the film thus produced was stored in the substantial absence of light for several months. It was then removed from storage and examined for film integrity. No observable degrading, separation, or settling had occurred in the hydroxypropyl starch-silver ion complex film. Another sample of the film was exposed to an image under visible light, whereupon the exposed portion gradually darkened to form the image on the film.

*Examples 19–22*

Examples 19–22 illustrate that the complexes of this invention can not be produced by the water-insoluble silver halides of the prior art compositions.

TABLE 1

| Ex. | Polysaccharide [a] | Silver Salt | Salt Concn., percent | Color of Precipitate | |
|---|---|---|---|---|---|
| | | | | Before Exposure | After Exposure |
| 1 | HPS | AgNO$_3$ | 20 | Yellow | Black. |
| 2 | HEC | AgNO$_3$ | 20 | White | Gray-black. |
| 3 | CMHPS | AgNO$_3$ | 20 | Yellow | Black. |
| 4 | CMC | AgNO$_3$ | 20 | White | Red-brown. |
| 5 | CMC [b] | AgNO$_3$ | 20 | ----do---- | Brown-red. |
| 6 | MC | AgNO$_3$ | 20 | ----do---- | Gray-black. |
| 7 | DEAEHPS | AgNO$_3$ | 20 | Yellow | Black. |
| 8 | EHEC | AgNO$_3$ | 20 | White | Brown. |
| 9 | HPS | AgC$_2$H$_3$O$_2$ | [c] Saturated | Yellow | Black. |
| 10 | HPS | AgF | 20 | ----do---- | Do. |
| 11 | HEC | AgC$_2$H$_3$O$_2$ | [c] Saturated | White | Gray-black. |

[a] 1% aqueous solution of the polysaccharide.
[b] The free acid form of CMC.
[c] Saturated at 76° F.

*Examples 12–17*

Examples 12–17 show the use of varying amounts of silver ions in accordance with this invention.

TABLE 2

| Ex. | Polysaccharide [a] | Silver Salt | Salt Concn., percent | Color of Precipitate | |
|---|---|---|---|---|---|
| | | | | Before Exposure | After Exposure |
| 12 | HPS | AgNO$_3$ | 20 | Yellow | Black. |
| 13 | HPS | AgNO$_3$ | 10 | ----do---- | Do. |
| 14 | HPS | AgNO$_3$ | 1 | ----do---- | Do. |
| 15 | HPS | AgNO$_3$ | 0.5 | ----do---- | Do. |
| 16 | HPS | AgNO$_3$ | 0.2 | Hazy | Dark brown. |
| 17 | HPS | AgNO$_3$ | 0.005 | ----do---- | Red-brown. |

[a] 1% aqueous solution of HPS.

The complexes of this invention, in addition to being extremely light-sensitive, are easily formed into homogeneous films without the need of a suspending agent or binder. The homogeneous films cast from the complexes of this invention have varied applica-

TABLE 3

| Ex. | Polysaccharide [a] | Silver Halide | Silver Halide Concn. | Precipitate |
|---|---|---|---|---|
| 19 | HPS | AgI | Saturated [b] | NO |
| 20 | HPS | AgI | 5% Slurry | NO |
| 21 | HPS | AgCl | Saturated [b] | NO |
| 22 | HPS | AgCl | 5% Slurry | NO |

[a] 1% Aqueous solution of HPS.
[b] Saturated at 76° F.

In Examples 19–22 above, equal parts of the 1% aqueous solution of HPS were added while stirring to the aqueous silver halide solution or slurry in the substantial absence of light. A precipitate did not form in any of these examples. No darkening or other color change was observed when the above solutions and slurries were exposed to strong sunlight for several hours. Thus, it will be noted that the complexes of this invention which decompose autocatalytically and undergo an almost immediate color change when exposed to visible light are not formed in the presence of water-insoluble silver halides, and also that they exhibit vastly superior light sensitivity as compared to the water-insoluble silver halide particles of the prior art compositions.

As many apparent and widely different embodiments of this invention may be made without departing from the spirit and scope thereof, it is to be understood that we do not limit ourselves to the specific embodiment thereof except as defined in the appended claims.

What we claim and desire to protect by Letters Patent is:

1. The process for producing a photosensitive film-forming complex which comprises mixing water-soluble silver salts with a water-soluble polysaccharide derivative in an aqueous medium in the substantial absence of light, said derivative being selected from the group consisting of ethers of cellulose and ethers of starch.

2. The process as defined in claim 1 wherein said water-soluble silver salts are from silver nitrate.

3. The process as defined in claim 1 wherein said derivative is carboxymethylcellulose.

4. The process as defined in claim 1 wherein said derivative is carboxymethyl hydroxypropyl starch.

5. The process as defined in claim 1 wherein said derivative is hydroxypropyl starch.

6. The process as defined in claim 1 wherein said derivative is hydroxyethyl cellulose.

7. A light-sensitive film-forming complex comprising the reaction product of a water-soluble polysaccharide derivative and water-soluble silver salts, said derivative being selected from the group consisting of ethers of cellulose and ethers of starch.

8. The complex as defined in claim 7 wherein said derivative is hydroxyethyl cellulose.

9. The complex as defined in claim 7 wherein said derivative is hydroxypropyl starch.

10. The complex as defined in claim 7 wherein said derivative is diethylaminoethyl hydroxypropyl starch.

11. The complex as defined in claim 7 wherein said derivative is carboxymethylcellulose.

12. The complex as defined in claim 7 wherein said derivative is carboxymethyl hydroxyalkyl starch.

13. A photosensitive material comprising a base sheet and a coating thereon comprising the reaction product of a water-soluble polysaccharide derivative and water-soluble silver salts, said derivative being selected from the group consisting of ethers of cellulose and ethers of starch.

References Cited

UNITED STATES PATENTS

| | | | |
|---|---|---|---|
| Re. 368 | 4/1865 | Tatum | 96—94 |
| 790,647 | 5/1905 | Morgan | 96—94 |
| 2,357,590 | 7/1939 | Jaffe | 96—113 |
| 2,725,293 | 4/1953 | Talbot et al. | 96—113 |
| 2,748,022 | 5/1956 | Hilborn | 96—113 |
| 3,003,878 | 10/1961 | Illingsworth et al. | 96—113 |

OTHER REFERENCES

Wall: Photographic Facts and Formulas, 1924, pp. 189–192, TR 150 W3.

Neblette: Photography Its Principles and Practice, 4th ed., 1942, p. 221, TR 145 N4.

NORMAN G. TORCHIN, *Primary Examiner.*

J. H. RAUBITSCHEK, *Assistant Examiner.*